(12) United States Patent
Baker

(10) Patent No.: US 9,399,560 B2
(45) Date of Patent: Jul. 26, 2016

(54) APPARATUS AND SYSTEM FOR RETRIEVING HOSE

(71) Applicant: Clinton D. Baker, Lorena, TX (US)

(72) Inventor: Clinton D. Baker, Lorena, TX (US)

( * ) Notice: Subject to any disclaimer, the term of this patent is extended or adjusted under 35 U.S.C. 154(b) by 547 days.

(21) Appl. No.: 13/739,600

(22) Filed: Jan. 11, 2013

(65) Prior Publication Data

US 2014/0197219 A1    Jul. 17, 2014

Related U.S. Application Data

(63) Continuation-in-part of application No. 11/854,763, filed on Sep. 13, 2007, now Pat. No. 8,376,202.

(60) Provisional application No. 60/825,671, filed on Sep. 14, 2006.

(51) Int. Cl.
| | |
|---|---|
| *B65H 51/32* | (2006.01) |
| *B65H 51/10* | (2006.01) |
| *A62C 33/00* | (2006.01) |
| *F16L 1/06* | (2006.01) |

(52) U.S. Cl.
CPC ............. *B65H 51/32* (2013.01); *A62C 33/00* (2013.01); *B65H 51/10* (2013.01); *F16L 1/065* (2013.01); *B65H 2701/33* (2013.01); *Y10T 137/6932* (2015.04)

(58) Field of Classification Search
CPC .. B65H 54/585; B65H 51/32; B65H 2701/33; B65H 2701/332; B65H 2701/333; B65H 51/10; B65H 51/105; A62C 33/00; Y10T 137/6932; F16L 1/065
See application file for complete search history.

(56) References Cited

U.S. PATENT DOCUMENTS

| | | | | |
|---|---|---|---|---|
| 3,713,301 | A  * | 1/1973 | Bryant | 405/177 |
| 8,376,202 | B2 * | 2/2013 | Baker | 226/1 |
| 2005/0011979 | A1* | 1/2005 | Best et al. | 242/370 |

FOREIGN PATENT DOCUMENTS

| | | | |
|---|---|---|---|
| EP | 631796 A1 * | 1/1995 | |
| JP | 08229157 A * | 9/1996 | |

* cited by examiner

*Primary Examiner* — William E Dondero

(57) ABSTRACT

The preferred system utilizes two devices to recover larger diameter hoses and couplings. Each of the devices has a plurality of lifting frame arms having a motor disposed between the lifting frame arms. The motor is operatively connected to the rotational drive roller also connected between the lifting frame arms. A hinge or other attaching arrangement that connects the lifting frame arms to mounts allows for lowering the lifting frame arms into a first position and lifting the lifting frame arms into a second position higher the lower rollers. A hydraulic lift cylinder can be utilized to raise and lower the lifting frame arms when a hose coupling on the hose is encountered during the hose recovery process. The devices can be lined up in series and spaced a few feet apart. The devices can be mounted to a tractor, trailer, truck or other similar equipment. A cage can surround the devices on top of the tractor, trailer, truck or other similar equipment. A passageway on top of the vehicle leading to the first of the devices can be utilized in the recovery effort to help guide the hose into the first device.

14 Claims, 4 Drawing Sheets

APPARATUS AND SYSTEM FOR RETRIEVING HOSE

CROSS REFERENCE TO RELATED APPLICATIONS

This non-provisional patent application claims priority to U.S. patent application Ser. No. 11/854,763 entitled "Apparatus for Recovering Hose" filed on Sep. 13, 2007 which claims priority to U.S. Provisional Patent Application No. 60/825,671 filed on Sep. 14, 2006.

FIELD OF THE DISCLOSURE

The disclosures made herein relate generally to the fire fighting industry. The invention discussed herein is in the general classification of a hose retrieval apparatus and system that is designed to recover flexible hoses used for conveying liquids such as fire hoses.

BACKGROUND

This section introduces aspects that may be helpful in facilitating a better understanding of the invention. Accordingly, the statements of this section are to be read in this light and are not to be understood as admissions about what is in the prior art or what is not in the prior art.

Fire hoses are traditionally comprised of multiple sections having hose couplings at opposite ends. The hose couplings are made of metal and cannot be compressed in the same manner as the hose. It is well known in the fire fighting field that long portions of flexible fire hose are difficult to recover after being utilized in a fire fighting situation. Long flexible fire hoses are notoriously difficult to retrieve after use due to the length, weight and large couplings used in connecting multiple sections of the hose. In typical day-to-day practice, several firefighters are necessary to recover and replace the fire hose, depending on the weight and length of the hose. A team of firefighters often must roll or fold up the flexible hose for storage on the fire engine. Such a burdensome practice may take many hours, and sometimes days, to complete.

A variety of automated or semi-automated hose retrieval devices and systems have been employed, but all of these suffer from inherent disadvantages. Some of these disadvantages include the inability to recover larger quantities of hose without expending substantial manpower time and effort and the inability to compactly recover hoses fitted with hose couplings, especially large diameter hose couplings. Some of the prior art devices also require a user to disassemble the recovery apparatus to remove the wound hose after it is collected. Other devices collect the hose in a confined area within the recovery apparatus, making it difficult to access. Other prior art solutions utilize a complex and unreliable pulley and sensing system and/or a complex mechanical belting mechanism. Most of the prior art solutions also do not adequately address the dangers associated with couplings becoming stuck in the recovery apparatus and associated with operational belts being flung off the apparatus and/or debris being thrown off the hose by the apparatus. The prior art solutions also lack adjustability and the ability to customize to a given project and are frequently expensive to purchase and maintain.

There is a need in the art for an easy to use, safe, adjustable, aesthetically pleasing, durable and relatively inexpensive hose retrieval device and system that allows fire hoses, including larger diameter hoses having larger couplings, to be recovered with minimal human intervention.

SUMMARY OF THE DISCLOSURE

The preferred system utilizes two devices to recover larger diameter hoses and couplings (e.g. twelve (12) inch diameter). The devices can be lined up in series and spaced a few feet apart. This arrangement permits at least one of the devices to be closed at all times and increases the pulling power to handle heavier hoses and couplings. The devices can be mounted to a tractor, trailer, truck or other similar equipment for ease of use and portability. A cage can surround the devices on top of the tractor, trailer, truck or other similar equipment to provide some protection from debris or other projectiles that may be strewn about during the hose recovery process and to prevent a user from becoming entangled with the devices when they open and close. A passageway on top of the vehicle leading to the first of the devices can be utilized in the recovery effort to help guide the hose into the first device to prevent bending and tangling of the hose.

In the preferred embodiment, each device has a plurality of lifting frame arms attached to a plurality of mounts. A biasing means such as a hinge or other attaching arrangement allows for lowering the lifting frame arms into a first position and lifting the lifting frame arms into a second position. A hydraulic lift system can be utilized to raise and lower the lifting frame arms when a hose coupling is encountered during the hose recovery process. A motor may be mounted between the lifting frame arms. The motor is coupled to a drive system and may comprise a cylindrical rotational drive roller, a motor sprocket, a rotational driver roller sprocket, an idler sprocket and a drive chain.

As a result of this arrangement, a single operator can control the motor by depressing and releasing an electric switch located either directly on the device or through a remote arrangement. In a first position, a hose is disposed between the rotational drive roller attached to the lifting frame arms of the devices and the lower rollers located beneath the rotational drive roller of the devices. Upon actuation of the rotational drive roller through use of the electric switch, the hose feeds through the devices and the hose can be collected and stored. When a coupling is encountered, the operator can utilize the hydraulic lift system to raise the lifting frame arms into a second position to permit the coupling to pass between the rotational drive roller and the lower rollers of the devices. Obviously, the operator can perform the same operation when the coupling arrives at either the first device or the second device to permit the coupling to safely pass through them.

In certain alternative embodiments, only one device may be utilized and mounted to a vehicle. In other alternative embodiments, more than two devices may be arranged in series (one device preferably directly behind the other device and spaced by an appropriate distance from the other device) on a vehicle.

In certain embodiments, the devices further comprise an adjustable, detachable support assembly. The support assembly comprises a tray plate, a rotatable tray plate hub and spindle, a swing arm, a swing arm hub and spindle and a base plate.

This system/arrangement permits recovery of thousands of feet of hose of large diameter (e.g. twelve (12) inches) utilizing a single operator of the devices and one other individual recovering and storing hose into the fire engine hose bed.

Under some applications embodiments of the invention may provide an apparatus and system that permit recovery of larger diameter hoses, including larger diameter couplings (e.g. twelve (12) inch diameter hose couplings).

Under some applications, embodiments of the invention may provide a relatively easy to use apparatus and system for recovering larger diameter hoses, including larger diameter couplings.

Under some applications, embodiments of the invention may provide a reliable to use apparatus and system for recovering larger diameter hoses, including larger diameter couplings.

Under some applications, embodiments of the invention may provide an inexpensive to manufacture apparatus and system for recovering larger diameter hoses, including larger diameter couplings.

Under some applications, embodiments of the invention may provide an inexpensive to operate and maintain apparatus and system for recovering larger diameter hoses, including larger diameter couplings.

Under some applications, embodiments of the invention may provide a durable apparatus and system for recovering larger diameter hoses, including larger diameter couplings.

Under some applications, embodiments of the invention may provide a strong apparatus and system for recovering larger diameter hoses, including larger diameter couplings.

Under some applications, embodiments of the invention may provide an apparatus and system for recovering larger diameter hoses, including larger diameter couplings, that is aesthetically pleasing.

Under some applications, embodiments of the invention may provide a safe apparatus and system for recovering larger diameter hoses, including larger diameter couplings.

Under some applications, embodiments of the invention may provide an adjustable apparatus and system for recovering larger diameter hoses, including larger diameter couplings.

Under some applications, embodiments of the invention may provide an apparatus and system for recovering larger diameter hoses, including larger diameter couplings, that requires minimal human intervention to operate.

BRIEF DESCRIPTION OF THE DRAWINGS

Some embodiments of apparatus and/or methods of the present invention are now described, by way of example only, and with reference to the accompanying drawings, in which.

DETAILED DESCRIPTION OF THE DRAWINGS

Figure 1:
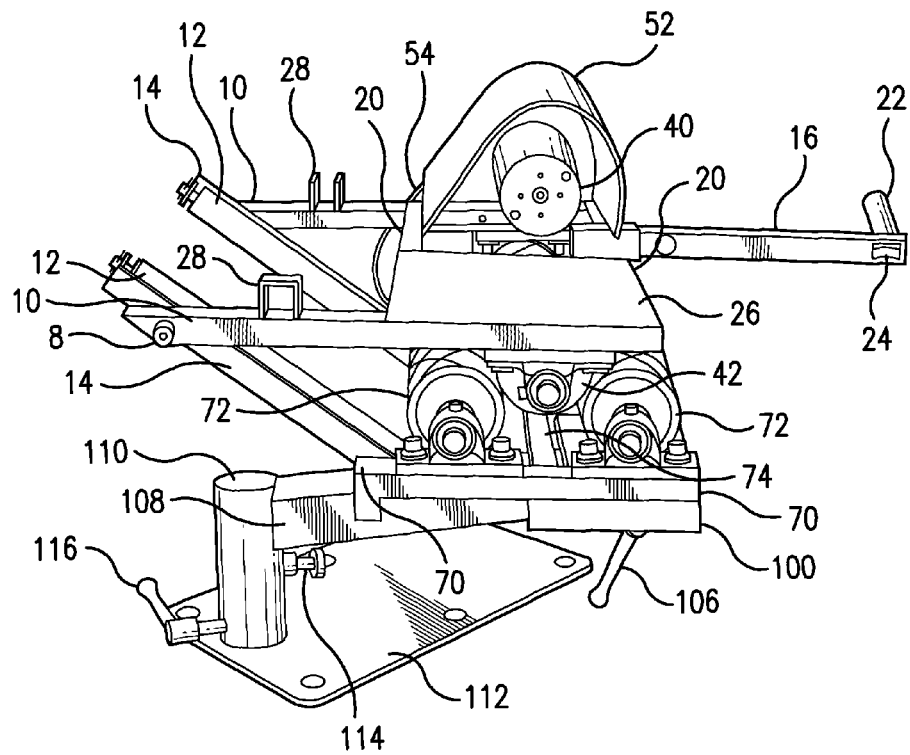
FIG. 1 is a perspective view of an embodiment of the present invention.

FIG. 1 is a perspective view of an embodiment of the present invention. An apparatus for recovering hose includes a lifting frame assembly comprising: a plurality of lifting frame arms 10 and a lifting arm 16. In one embodiment, the lifting frame arms 10 and the lifting arm 16 are constructed of fourteen gauge, one inch square tubing. The lifting arm 16 includes an affixed lifting handle 22 and an electric switch 24. The lifting handle 22 is preferably fitted with a grip suited to an operator's comfort. The electric switch is preferably a 15 amp momentary rocker switch. The plurality of lifting frame arms 10 are coupled to a plurality of guide roller mounts by a plurality of biasing means hinges 8, such as ½ inch stainless steel shoulder bolts, to allow for lowering of the lifting frame arms 10 into a first position and lifting the lifting frame arms 10 into a second position. A plurality of guide rollers 12, preferably 1½ inch, constructed of galvanized steel, are attached to the plurality of guide roller mounts 14. The lifting frame assembly further comprises a plurality of support arms 20, preferably of one inch square tubing, attached between and perpendicular to the plurality of lifting frame arms 10. The lifting arm 16 is removably attached the center of one of the support arms 20, preferably in the positions shown in FIG. 1-2. A flat safety plate 26, preferably constructed of 16 gauge to 18 gauge sheet metal, covers the plurality of support arms 20 and one of the lifting frame arms 10 to protect a user of the apparatus for recovering hose from injury. A plurality of lifting arm storage brackets 28 affixed to the lifting frame arms 10 allow for storage of the lifting arm 16 when the lifting arm 16 is removed from the apparatus. The lifting arm 16 may be removed from the apparatus and stored during periods of time when the apparatus is dormant.

A motor 40, preferably a 12 volt gear reduced electric motor, is mounted atop the lifting frame assembly. Other means of powering the apparatus, such as a 5 horsepower gas-powered motor with a 6:1 gear reducer, may also be used. Those skilled in the art will understand that a power supply (not shown) supplies power to the motor 40, which is thereafter mechanically coupled to a drive system as shown in FIG. 2.

Figure 2:
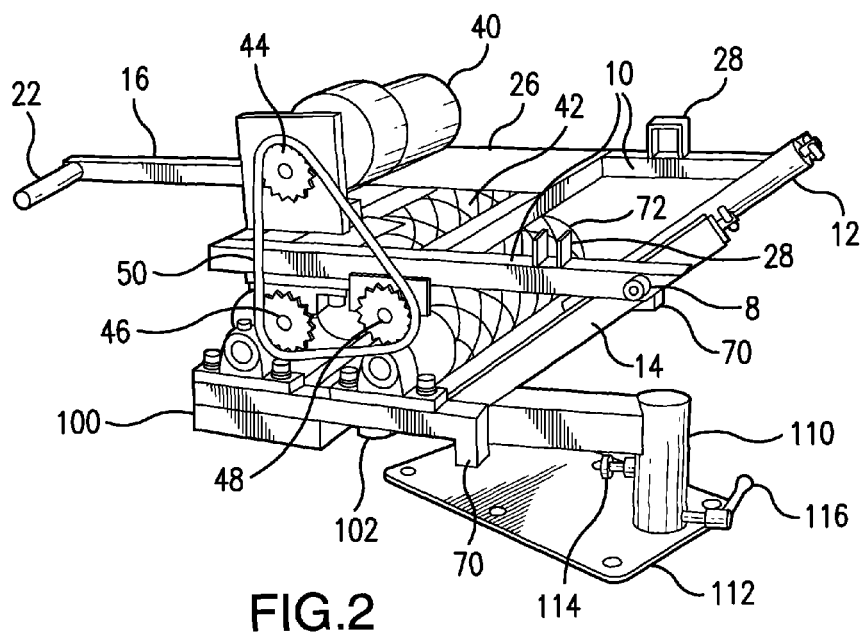
FIG. 2 is a rotated perspective view of an embodiment of the present invention.

FIG. 2 is a rotated perspective view of an embodiment of the present invention. The drive system comprises a rotational drive roller 42, which is constructed with a 3½ inch diameter cylindrical form and preferably made of a pliable surface such as diamond groove vulcanized rubber lagging with a rubber durometer of 60. The rotational drive roller 42 is removably secured on each of its ends to the plurality of lifting frame arms 10 on the opposite side of the motor 40. The rotational drive roller 42 may be secured to the lifting frame arms 10 by any available securing means, including bolting, welding, clamping or any similar securing means. The drive system further comprises a motor sprocket 44, preferably of 3½ inch diameter, a rotational drive roller sprocket 46, preferably of 3 inch diameter, and an idler sprocket 48, preferably of 3½ inch diameter, which are all co-rotational sprockets connected via a drive chain 50.

Those skilled in the art will understand that the electric switch 24 is normally connected via electrical wiring means to the motor 40 and that an operator's depression of the electric switch 24 supplies power to and activates the motor 40. Similarly, the operator's release of the electric switch 24 eliminates power to and deactivates the motor 40. When the operator of the apparatus for recovering hose depresses electric switch 24 and the motor 40 actuates, the motor 40 engages the motor sprocket 44, which in turn sets into motion the idler sprocket 48, which in turn sets into motion the rotational drive roller sprocket 46 for the reason that all are interconnected and continuously propelled by the drive chain 50. The rotational driver roller sprocket 46 is coupled to rotational driver roller 42. The actuation of the motor sprocket 44, and then in turn the actuation of the idler sprocket 48 and then in turn the actuation of the rotational driver roller sprocket 46 causes the rotational drive roller 42 to rotate counterclockwise on its own axis, as the reader views the apparatus as it is situated in FIG. 1. A motor cowling 52 and a drive cowling 54, both preferably constructed of 16 gauge sheet metal, are removably attached to the lifting frame arms 10 and cover the drive system and the motor 40. The motor cowling 52 and the drive cowling 54 protect the apparatus and the operator from damage or injury.

The plurality of guide roller mounts 14 are secured to a plurality of lower roller support arms 70, preferably constructed of one inch square tubing. A plurality of lower rollers 72, preferably 3½ inches in diameter, are secured at each of their ends to the plurality of lower roller support arms 70. The plurality of lower rollers 72 may be secured to the plurality of lower roller support arms 70 by any available securing means, including bolting, welding, clamping or any similar securing means. The plurality of lower rollers 72 are constructed preferably with a pliable surface such as diamond groove vulcanized rubber lagging with a rubber durometer of 60. The plurality of lower rollers 72 are freely rotatable about their respective axes. A plurality of lower roller support arm support members 74, constructed of one inch square tubing, are attached underneath and perpendicular to the lower roller support arms 70. As shown in FIGS. 1-2 and more fully shown in FIG. 3, the lower roller support members 74 are disposed into an adjustable, detachable support assembly.

Figure 3:
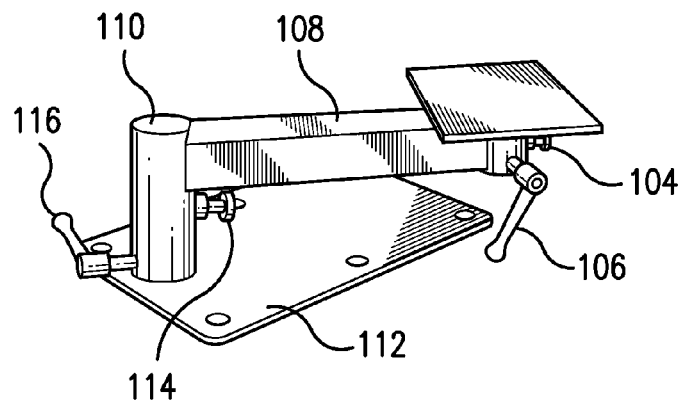
FIG. 3 is a perspective view of the support assembly of an embodiment of the present invention.

FIG. 3 is a perspective view of the support assembly of an embodiment of the present invention. The adjustable support assembly comprises a removably attached tray plate 100, a rotatable tray plate hub and spindle 102, a swing arm 108, a swing arm hub and spindle 110, and a base plate 112. The tray plate 100, constructed of steel, is preferably secured to the lower roller support arm support members 74 by a common lock pin (not shown). The tray plate 100 is secured to the rotatable tray plate hub and spindle 102. The tray plate 100 and the tray plate hub and spindle 102 are detachably affixed together by a spring loaded tray plate lock pin 104. A tray plate locking handle 106, in a tray plate locking handle closed position, prevents rotation of the tray plate 100 about the tray plate hub and spindle 102. In a tray plate locking handle's open position, rotation of the tray plate 100 about the tray plate hub and spindle 102 can occur. The swing arm 108, preferably constructed of 2 inch squaring tubing with a ¼ inch to ⅜ inch wall, is attached to and disposed between the tray plate hub and spindle 102 and the swing arm hub and spindle 110. A swing arm locking handle 116, in a swing arm locking handle's closed position, prevents rotation of the swing arm 108 about the swing arm hub and spindle 110. In a swing arm locking handle's open position, rotation of the swing arm 108 about the swing arm hub and spindle 110 can occur. The swing arm hub and spindle 110 is detachably affixed to the base plate 112 by a spring loaded tray plate lock pin 114. The base plate 112 can be mounted to a hose collecting and storage container, preferably a fire truck. The rotatability of both the swing arm 108 and the tray plate 100 provide the operator with the ability to adjust the apparatus for recovering hose into the operator's desired operating position.

Figure 4:
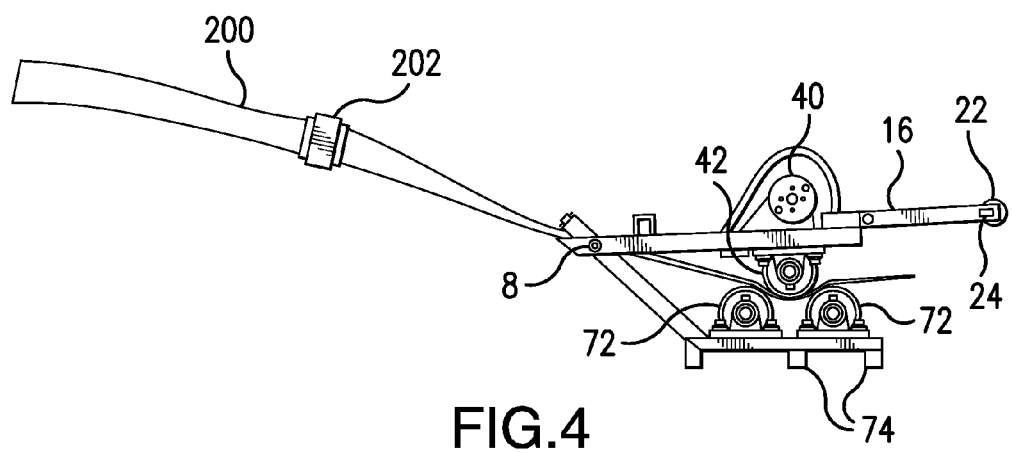
FIG. 4 is a side view of an embodiment of the present invention in action prior to encountering a hose coupling.
Figure 5:
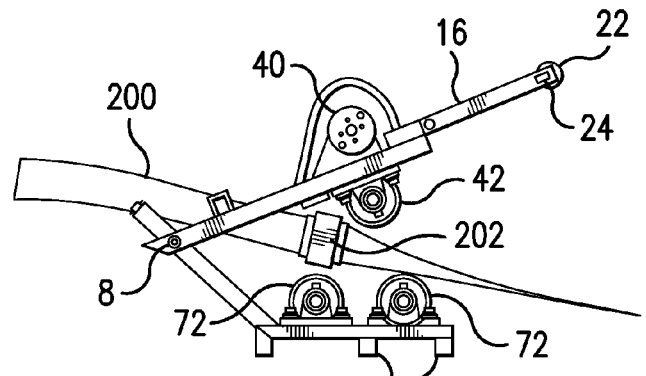
FIG. 5 is a side view of an embodiment of the present invention in action at the time a hose coupling is encountered.

Referring to FIGS. 4-5, where the principle of action of the transmission of this invention is shown, the apparatus for recovering hose as described in FIGS. 1-3 receives the hose 200 for recovery in a direction from left to right and is adaptable to pass a hose coupling 202 therethrough without any difficulty.

FIG. 4 is a side view of an embodiment of the present invention in action prior to encountering a hose coupling.

FIG. 4 shows the apparatus for recovering hose in a first position, wherein hose 200 has entered the apparatus for recovering hose by having been disposed through the plurality of guide rollers 12, which are preferable rotatable and which guide the hose 200 in a position to move through the apparatus for recovering hose. FIG. 4 further shows the hose 200 disposed between the rotational drive roller 42 and the plurality of lower rollers 72, preferably two lower rollers of substantially similar size to the rotational drive roller 42.

During initiation of a hose recovery operation, the hose 200 should be positioned as shown in FIG. 4. An operator of the apparatus for recovering hose depresses the electric switch 24 to actuate the drive system as described above and shown in FIG. 2. Upon actuation of the drive system, in the first position, rotational drive roller 42 begins feeding the hose through the apparatus for hose recovery. The movement of the hose 200 caused by the initiation of drive roller 42 additionally causes the plurality of lower rollers 72 which are also in contact with the hose 200 to rotate about their axes. Once the hose 200 passes through the apparatus for recovering hose, the hose 200 can be collected, and preferably flaked and stored in the truck. The operator of the apparatus for recovering hose manually applies downward pressure to the lifting arm 16 so that the rotational drive roller 42, the hose 200, and the plurality of lower rollers 72 remain in contact throughout the hose recovery operation.

FIG. 5 is a side view of an embodiment of the present invention in action at the time a hose coupling is encountered. FIG. 5 illustrates the time in a hose recovery operation when the apparatus for recovering hose encounters a hose coupling 202. During the hose recovery operation, when a hose coupling 202 is encountered, the operator while continuation to depress the electric switch, will manually lift the lifting handle 22 to raise the lifting arm 16 vertically into a second position to provide space for the hose coupling 202 to dispose between the rotational drive roller 42 and the plurality of lower rollers 72. The rotational driver roller 42 continually contacts the hose coupling 202 until the hose coupling 202 passes through the apparatus for recovering hose. For purposes of illustration, FIG. 5 shows the hose coupling 202 as not contacting the rotational drive roller 42 or the plurality of lower rollers 72. It is preferable for the rotational driver roller 42, the hose coupling 202, and the plurality of lower rollers 72 to remain in contact as to continue feeding of the hose 200 through the apparatus for hose recovery. In addition, in FIGS. 4-5, for purposes of illustration, the detachable support assembly has been detached.

After the hose coupling 202 passes through the apparatus for recovering hose, the operator will apply manual downward pressure to the lifting handle 22 as to allow the lifting arm 16 to descend back into the first position as shown in FIG. 4.

At any time during the hose recovery operation, the operator may release the electric switch 24 to terminate the power supply to the motor 40. Said release deactivates the drive system to the apparatus for recovering hose and will terminate the hose recovery operation.

Figure 6:
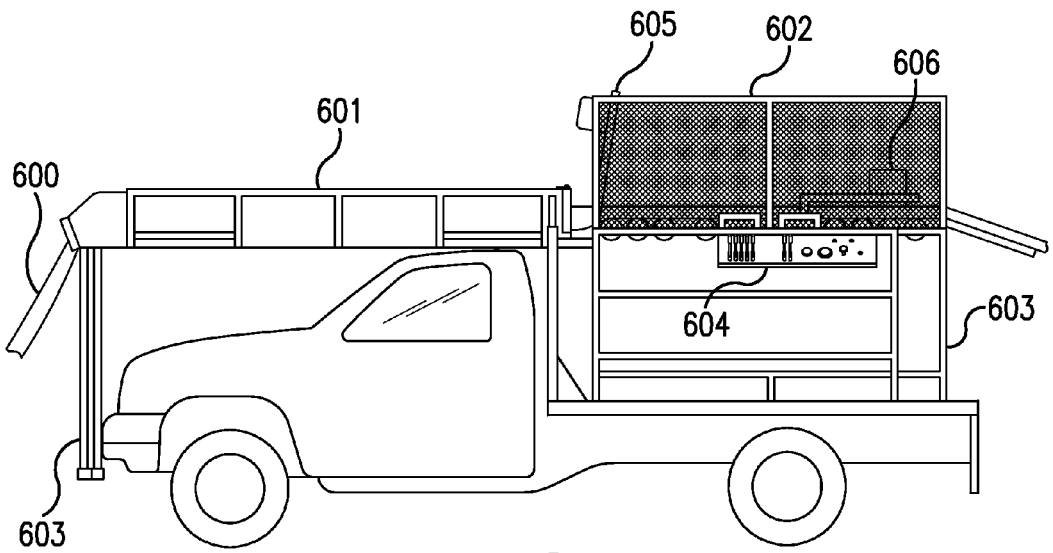
FIG. 6 is a side view of an embodiment of the system of the present invention.

FIG. 6 is a side view of an embodiment of the system of the present invention. A first device 605 and a second device 606 are utilized to recover a larger diameter hose 600 having couplings (e.g. twelve (12) inch diameter). The devices 605, 606 are mounted on top of the bed of a truck. The preferred embodiments of the devices 605, 606 are shown in further detail in FIG. 8.

The devices 605, 606 are lined up in series and spaced a few feet apart (with both devices situated in the same direction). This arrangement permits at least one of the devices to be closed at all times and increases the pulling power to handle heavier hoses and couplings. The devices can be mounted to a tractor, trailer, truck or other similar equipment. A cage 602 surrounds the devices 605, 606 on top of the truck to provide protection from debris or other projectiles that may be strewn about during the hose recovery process and to protect users from becoming entangled in the devices when they open and close. A passageway between two walls 601 on top of the vehicle leading to the first device 605 is utilized in the recovery effort to help guide the hose 600 into the first device 605 to prevent bending and tangling of the hose 600. A variety of metal bars 603 are utilized to provide support for mounting the walls 601, cage 602 and devices 605, 606. Because the preferred embodiment of the system utilizes a hydraulic lifting system to open and close the devices 605, 606, a variety of hydraulic equipment and controls 604 are located beneath and operatively attached to the devices 605, 606.

Figure 7:
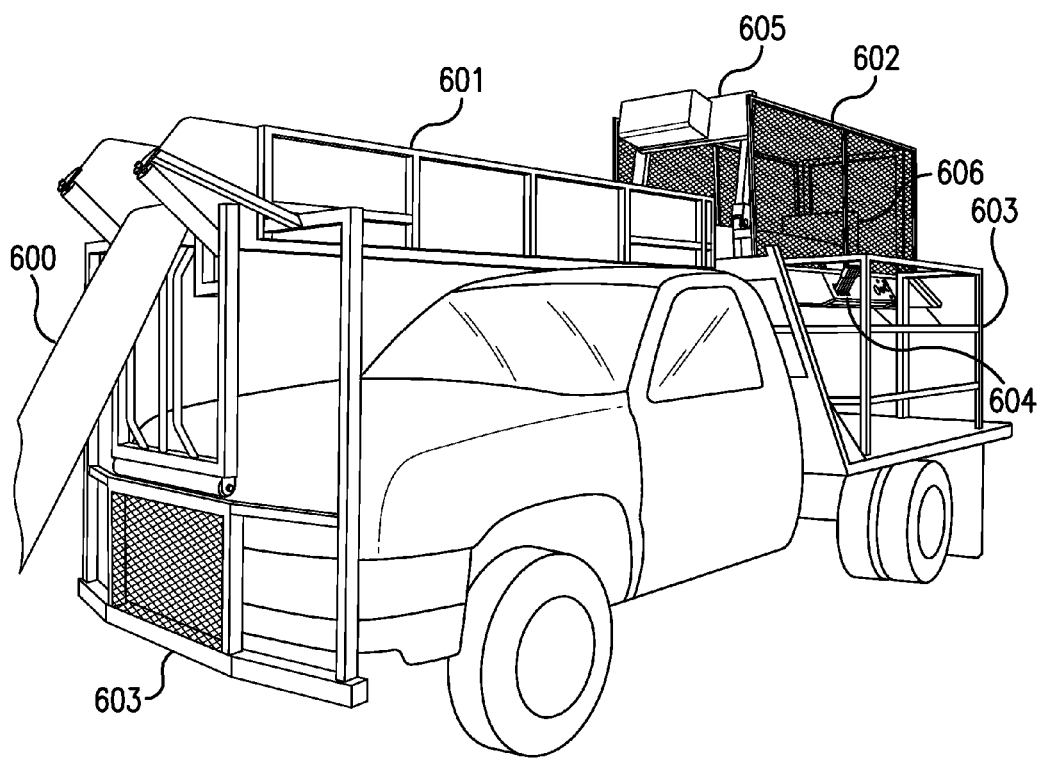
FIG. 7 is a perspective view of an embodiment of the system of the present invention.

FIG. 7 is a perspective view of an embodiment of the system of the present invention. The first device 605 and the second device 606 are utilized to recover a larger diameter hose 600 and couplings (e.g. twelve (12) inch diameter) and are mounted on top of the bed of a truck. The first device 605 is in the open position that is appropriate for permitting a hose coupling to pass through the device while the second device 606 is in a closed position to continue pulling the hose 600 through both devices 605, 606. The cage 602 surrounds the devices 605, 606 on top of the truck to provide some protection from debris or other projectiles that may be strewn about during the hose recovery process and to protect the users from becoming entangled in the devices during operation. The passageway between two walls 601 on top of the vehicle leading to the first device 605 is shown in better detail than in FIG. 6 with the hose 600 disposed between the two walls 601 being pulled along the bottom of the passageway connecting the walls 601. In certain embodiments, the bottom of the passageway may be a series of rollers or other conveyor belt arrangement to assist in moving the hose toward the devices 605, 606. A variety of metal bars 603 are utilized to provide support for mounting the walls 601, cage 602 and devices 605, 606. As previously mentioned, because the preferred embodiment of the system utilizes a hydraulic lifting system to open and close the devices 605, 606, a variety of hydraulic equipment and controls 604 are located beneath and attached to the devices 605, 606.

As one skilled in the art would recognize, a single device could also be mounted to a vehicle in a similar manner as described herein or, alternatively, more than two devices could be mounted to a vehicle in a similar manner as described herein. In certain alternative embodiments, one device could be mounted to a vehicle and a second device could be mounted to a second vehicle, trailer or other apparatus. For example, a first device could be mounted to a truck and a second device could be mounted several feet behind it and located on a trailer or other apparatus. This arrangement may permit for easier hose recovery by individuals in the trailer and better accessibility and maneuverability of the devices to customize the use of the devices to a given project.

Figure 8:
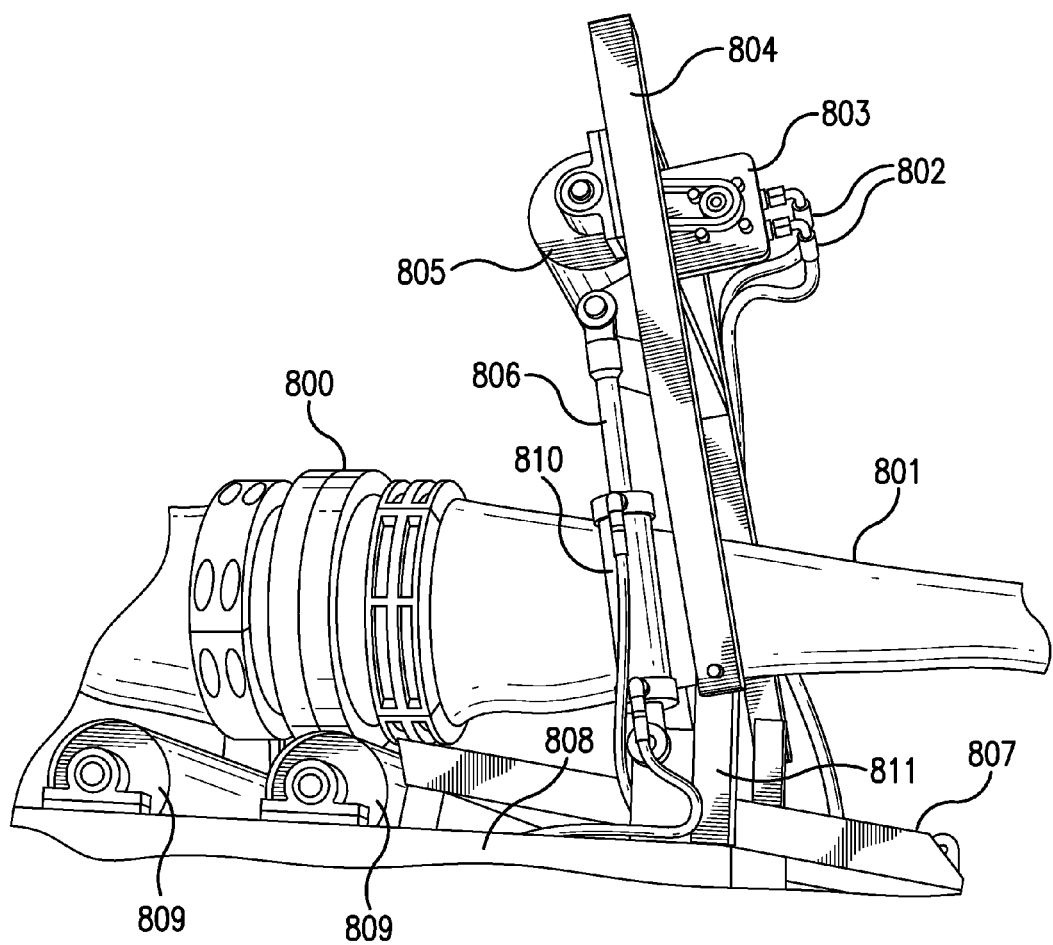
FIG. 8 is a side view of an alternative embodiment of the apparatus of the present invention.

FIG. 8 is a side view of an alternative embodiment of the apparatus of the present invention. The apparatus/devices shown in FIGS. 1-2 and FIGS. 4-5 could obviously be opened and closed through the use of a hydraulic lifting system. In such an arrangement, the lifting arm obviously would not be a necessary component of the device and a hydraulic lift system would be attached instead. FIG. 8 details the preferred embodiment of the apparatus when it is hydraulically operated.

In the embodiment shown in FIG. 8, the device has a plurality of lifting frame arms 804 having a motor disposed between the lifting frame arms 804 located beneath a cover 803. The motor is operatively connected to the rotational drive roller 805 also connected between the lifting frame arms 804. A biasing means such as a hinge connected to a pair of mounts 811 or other attaching arrangement similar to a hinge allows for lowering the lifting frame arms 804 into a first position and lifting the lifting frame arms 804 into a second position. A hydraulic lift cylinder 806 is utilized to raise and lower the lifting frame arms 804 when a hose coupling 800 on the hose 801 is encountered during the hose recovery process. The lower rollers 809 are stationary in this preferred embodiment (meaning they are not moved up and down from their position but are free to rotate) and are shown with the coupling 800 resting on and between them. A platform 807 allows the coupling 800 to slide down it for easier storage after it passes the lower rollers 809. Framing 808 on the bottom of the device allows the device to be mounted to a truck or other vehicle. The lower rollers 809 are attached to the framing 808 connected to the pair of mounts 811 and the lower rollers 809 are located beneath the rotational drive roller 805 when the rotational drive roller 805 is in the first position. The hoses 802 permit oil or other fluid to travel through the system and activate the hydraulic lift cylinder 806.

Two of these devices can be installed in series as shown in FIGS. 6-7. As a result of this arrangement, a single operator can control the motor on the devices by depressing and releasing an electric switch or hydraulic control valve located either directly on the devices or through a remote arrangement to cause the rotational drive roller on each device to begin collecting hose. The hydraulic lift system can be employed to allow, in a first position, the hose to be disposed between the rotational drive roller and the lower rollers. When a coupling is encountered, the operator can utilize the hydraulic lift system to raise the lifting frame arms into a second position to permit the coupling to pass. Obviously, the operator can perform the same operation when the coupling arrives at either device to permit the coupling to safely pass through both devices.

During the hose recovery operation, the rotational drive roller and the lower rollers of each device ideally remain in contact with the hose and/or the hose coupling, depending on which is passing through the device at a particular point in time. In addition, the hydraulically controlled apparatus shown in FIG. 8 can also be attached to an adjustable support assembly such as the one detailed in FIG. 3 to permit it to be maneuvered into different positions if necessary for any given project.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A system for recovering hose comprising:
   a first device mounted on a vehicle wherein the first device has a first pair of lifting frame arms to pivot about a first pair of mounts when a force is applies to the first pair of lifting frame arms to allow the first pair of lifting frame arms to be lowered in to a first position and raised to second position and a first rotational drive roller operatively connected to a first motor, wherein the first rotational drive roller and the first motor are secured to the first pair of lifting frame arms, and a first pair of lower rollers attached to framing connected to the first pair of mounts wherein the first pair of lower rollers are located substantially beneath the first rotational drive roller when the first rotational drive roller is in the first position.

2. The system for recovering hose of claim 1 further comprising: a cage surrounding the first device on the vehicle.

3. The system for recovering hose of claim 2 further comprising:
a passageway between two walls on the vehicle leading to the first device wherein the force applied to the first pair of lifting frame arms is imparted through the use of a hydraulic cylinder attached to the first pair of lifting frame arms.

4. The system for recovering hose of claim 1 further comprising:
a second device located on a trailer behind the vehicle wherein the second device has a second pair of lifting frame arms and a second pair of mounts rotatably affixed to the second pair of lifting frame arms in a manner that allows the second pair of lifting frame arms to pivot about the second pair of mounts when a force is applied to the second pair of lifting frame arms to allow the second pair of lifting frame arms to be lowered into a first position and raised to a second position and a second rotational drive roller operatively connected to a second motor and secured to the second pair of lifting frame arms and a second pair of lower rollers attached to a second framing connected to the second pair of mounts wherein the second pair of lower rollers are located substantially beneath the second rotational drive roller when the second rotational drive roller is in the first position.

5. An apparatus for recovering hose comprising:
(a) a pair of lifting frame arms;
(b) a pair of mounts rotatably fixed to the pair of lifting frame arms in a manner that allows the pair of lifting frame arms to pivot about the pair of mounts when a force is applied to the lifting frame arms to allow the pair of lifting frame arms to be lowered into a first position and raised to a second position;
(c) a rotational drive roller operatively connected to a motor, wherein the rotational drive roller and the motor are secured to the pair of lifting frame arms; and
(d) a pair of lower rollers attached to framing connected to the pair of mounts wherein the pair of lower rollers are located substantially beneath the rotational drive roller when the rotational drive roller is in the first position.

6. The apparatus of claim 5 further comprising an electric switch operatively connected to the motor to power the rotational drive roller.

7. The apparatus of claim 5 further comprising:
a motor sprocket, a rotational drive roller sprocket and an idler sprocket connected via a drive chain wherein the motor engages the motor sprocket and wherein the rotational drive roller sprocket is operatively connected to the rotational drive roller.

8. The apparatus of claim 5 wherein the motor is disposed between the pair of lifting frame arms.

9. The apparatus of claim 8 wherein the motor is located beneath a cover disposed between the pair of lifting frame arms.

10. The apparatus of claim 5 wherein a hydraulic lift cylinder is utilized to create the force to allow the pair of lifting frame arms to be raised to the second position.

11. A system for recovering hose comprising:
a first device and a second device mounted on a vehicle,
wherein the first device has a first pair of lifting frame arms and a first pair of mounts rotatably affixed to the first pair of lifting frame arms in a manner that allows the first pair of lifting frame arms to pivot about the first pair of mounts when a force is applied to the first pair of lifting frame arms to allow the first pair of lifting frame arms to be lowered into a first position and raised to a second position, and a first rotational drive roller operatively connected to a first motor, wherein the first rotational drive roller and the first motor are secured to the first pair of lifting frame arms, and a first pair of lower rollers attached to a first framing connected to the first pair of mounts wherein the first pair of lower rollers are located substantially beneath the first rotational drive roller when the first rotational drive roller is in the first position, and
wherein the second device has a second pair of lifting frame arms and as a second pair of mounts rotatably affixed to the second pair of lifting frame arms in a manner that allows the second pair of lifting frame arms to pivot about the second pair of mounts when a force is applied to the second pair of lifting frame arms to allow the second pair of lifting frame arms to be lowered in to a first position and raised to a second position, and a second rotational drive roller operatively connected to a second motor and secured to the second pair of lifting frame arms and a second pair of lower rollers attached to a second framing connected to the second pair of mounts wherein the second pair of lower rollers are located substantially beneath the second rotational drive roller when the second rotational drive roller is in the first position.

12. The system for recovering hose of claim 11 further comprising: a cage surrounding the first device and the second device and mounted on the vehicle.

13. The system for recovering hose of claim 12 further comprising:
a passageway between two walls mounted on the vehicle leading to the first device wherein the first device and the second device are lined up in series and the force applied to the first pair of lifting frame arms and the second pair of lifting frame arms is imparted through the use of at least a first hydraulic cylinder attached to the first pair of lifting frame arms and at least a second hydraulic cylinder attached to the second pair of lifting frame arms.

14. The system for recovering hose of claim 13 wherein a bottom of the passageway between the two walls mounted on the vehicle is comprised of a series of rollers.

* * * * *